Aug. 5, 1969     D. G. FAWKES     3,459,058
VALVE OPERATOR

Filed July 14, 1967     2 Sheets-Sheet 1

Inventor:
Donald G. Fawkes
By: Hofgren, Wegner, Allen,
Stellman & McCord
Attorneys

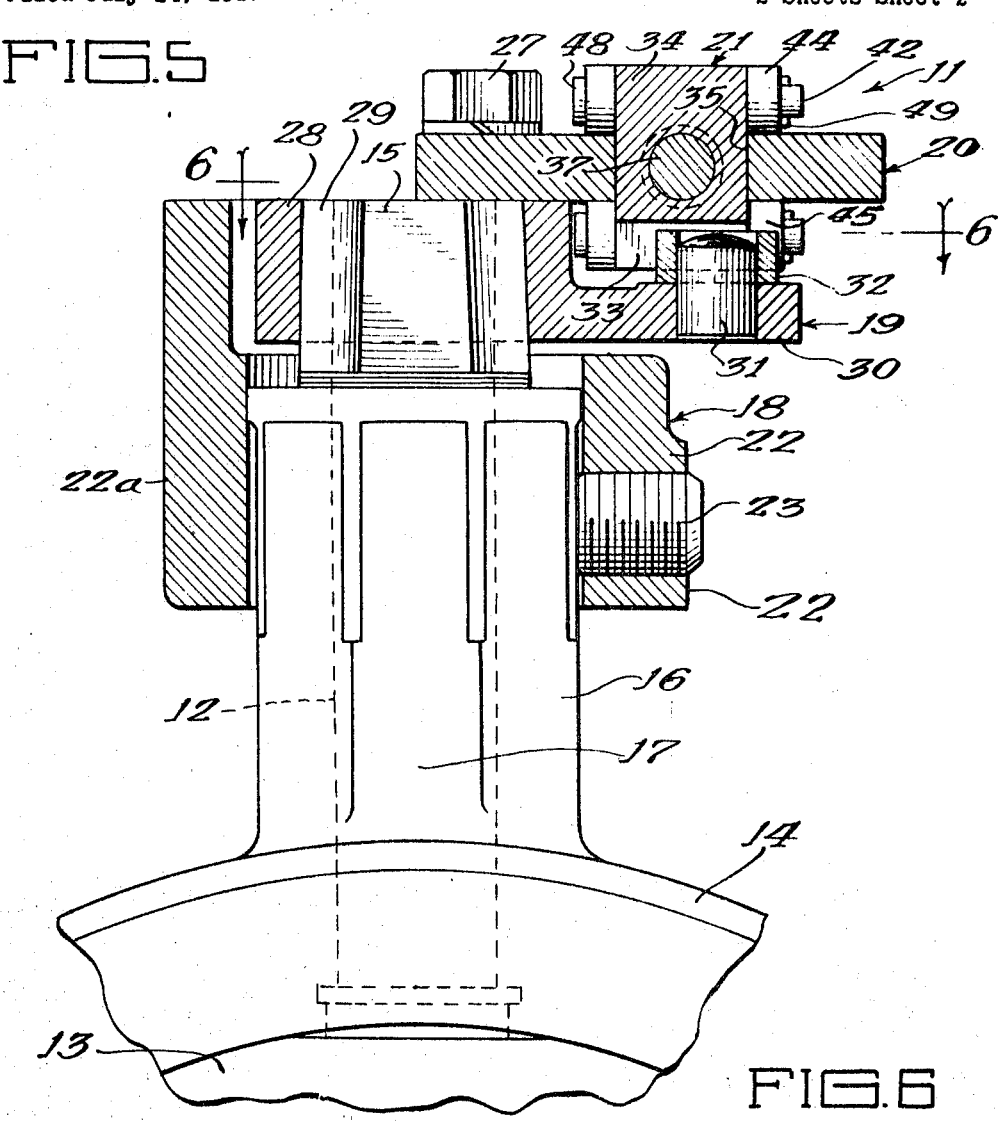
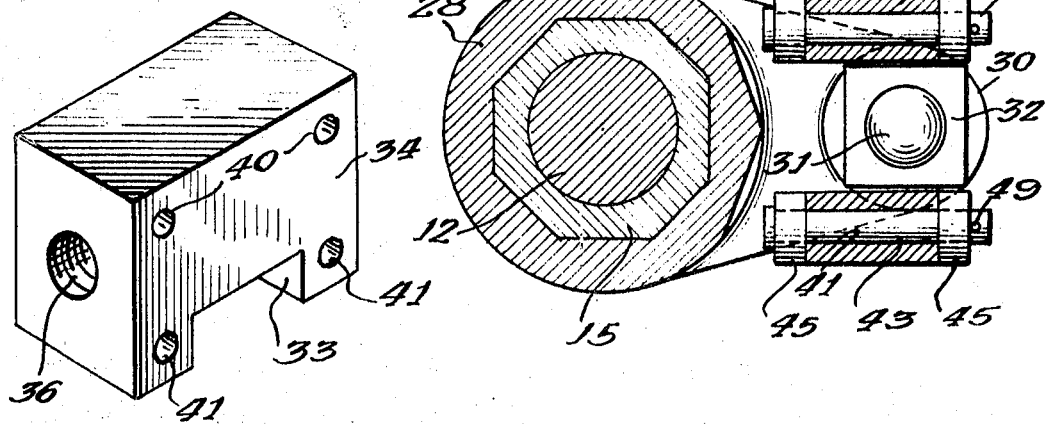

United States Patent Office 3,459,058
Patented Aug. 5, 1969

3,459,058
VALVE OPERATOR
Donald G. Fawkes, Aurora, Ill., assignor to Henry Pratt Company, a corporation of Illinois
Filed July 14, 1967, Ser. No. 653,389
Int. Cl. F16h 29/20
U.S. Cl. 74—89.15
10 Claims

ABSTRACT OF THE DISCLOSURE

A valve operator mounted on a valve body having an end of a valve shaft projecting outwardly therefrom. The operator includes a guide plate fixedly carried by the valve body, a lever connected to the valve shaft, and means movably carried by the guide plate for operating the lever to rotate the valve shaft.

---

This invention relates to valve operators, and in particular to valve operators for rotating a valve member about a shaft axis thereof.

In conventional cone, ball, butterfly, and similar rotary type valves, the valve member is carried on a shaft which is rotatable about the axis thereof to arrange the valve member selectivley in a valve closed and a valve opened position. To effect rotation of the valve shaft, a lever is attached to a portion of the valve shaft projecting from the valve body and means are provided for effecting a suitable turning of the lever about the axis of the valve shaft as desired. The present invention comprehends a new and improved operator for effecting such selective disposition of such a valve.

Thus, a principal feature of the present invention is the provision of a new and improved valve operator.

Another feature of the invention is the provision of such a valve operator which is extremely simple and economical of construction.

A further feature of the invention is the provision of such a valve operator wherein the lever is associated with the operating mechanism and the valve shaft in a new and improved manner.

Still another feature of the invention is the provision of such a valve operator for turning a valve shaft projecting outwardly through a hub, the operator including a yoke having an annular bight portion for fixed mounting on the hub and leg portions extending outwardly therefrom, a lever having a first portion adapted to be connected to the projecting valve shaft and a second portion overlying the yoke bight portion, a guide plate carried by the yoke legs and overlying the lever second portion, and means on the guide plate connected to the lever for movement relative to the guide plate to turn the lever about the axis of the projecting shaft.

Another feature of the invention is the provision of such a valve operator wherein the elements thereof are disposed in a compact readily operable arrangement for facilitated operation of the valve shaft.

Other features and advantages will become readily apparent from the following detailed description taken in connection with the accompanying drawings, in which:

FIGURE 5 is a fragmentary enlarged vertical diametric section of the valve structure;

FIGURE 6 is a fragmentary horizontal section taken substantially along the line 6—6 of FIGURE 5; and FIGURE 7 is an isometric view of the slide block of the operator.

Figure 1:
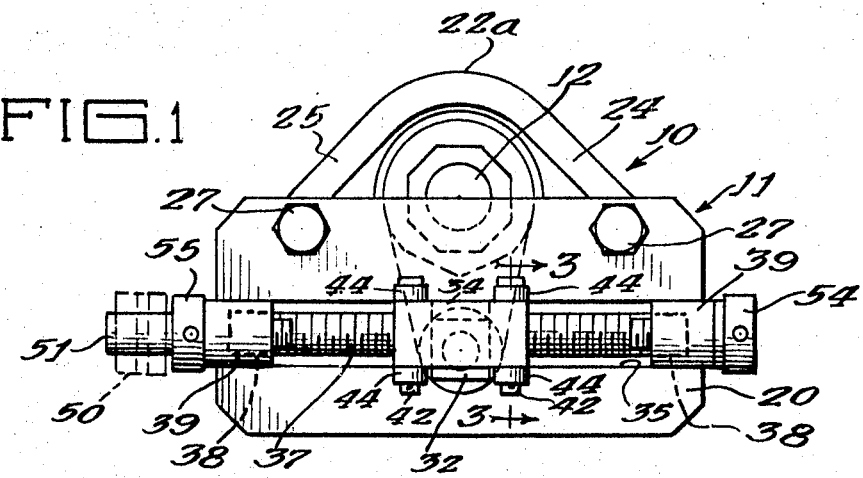
FIGURE 1 is a top plan view of a valve structure having an operator embodying the invention.

In the exemplary embodiment of the invention as disclosed in the drawing, a valve structure, generally designated 10, is shown to comprise a valve operator, generally designated 11, for turning the shaft 12 of a valve member 13 rotatably carried in a valve body 14. The shaft 12, as shown in FIGURE 5, includes an outer portion 15 projecting outwardly from a bearing boss, or hub, 16 on the valve body 14 for rotation of the shaft about the axis 17 thereof, thereby to dispose the valve member 13 selectively in valve open and valve closed positions. In the illustrated embodiment the valve member 13 comprises a butterfly valve disc.

The valve operator 11 includes a yoke member, generally designated 18, a lever, generally designated 19, a guide plate, generally designated 20, and a drive structure, generally designated 21, carried on the guide plate 20 for turning the lever 19 about the axis 17 of the valve shaft as desired.

Figure 2:
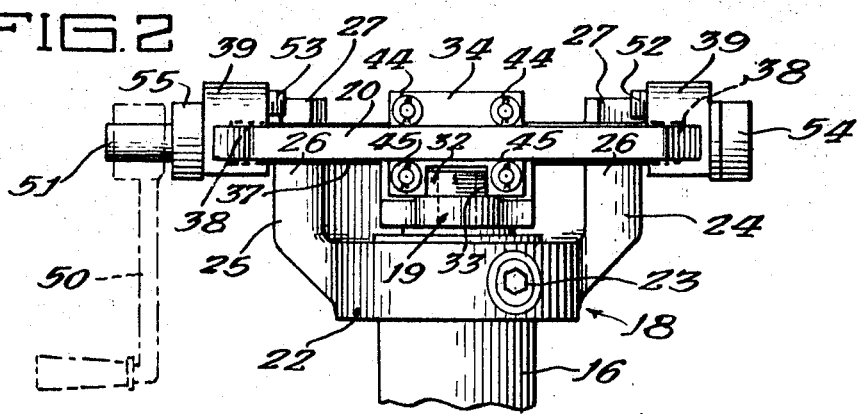
FIGURE 2 is a fragmentary side elevation thereof.
Figure 3:
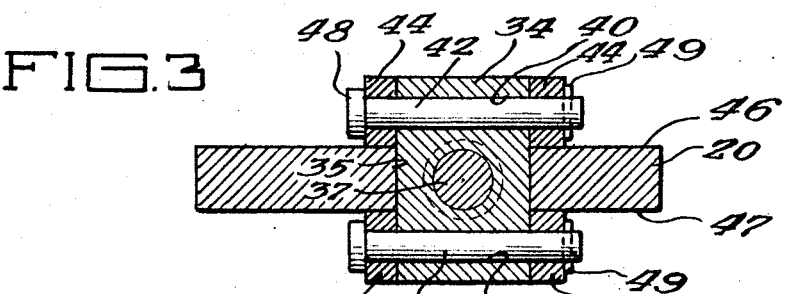
FIGURE 3 is an enlarged framentary vertical section taken substantially along the line 3—3 of FIGURE 1.
Figure 4:
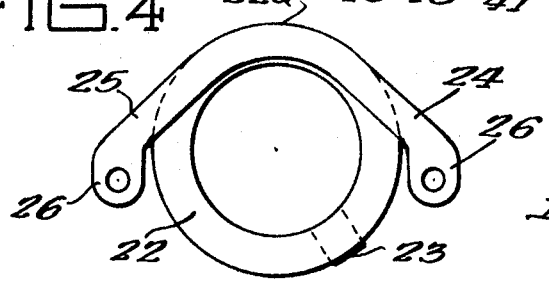
FIGURE 4 is a top plan view of the yoke structure thereof.

More specifically, the yoke 18 includes an annular portion 22 fixedly secured to the upper end of the boss 16 by means of a set screw 23. As best seen in FIGURES 2, 4, and 5, the yoke includes a pair of legs 24 and 25 upstanding and extending laterally outwardly from a rear bight portion 22a of the yoke portion 22. Each leg terminates at its distal end in a support portion 26. The guide plate 20 is fixedly secured to the leg portions 26 by suitable means such as machine bolts 27 to fix the guide plate 20 rigidly relative to the boss 16. As best seen in FIGURE 5, lever 19 thusly extends subjacent the guide plate 20 and above the lower portion 22 of the yoke 18, an inner portion 28 of the lever being fixedly secured to a sleeve 29 fixed to the upper end 15 of the shaft 12. As shown in FIGURES 5 and 6, the lever 19 further includes an outer portion 30. Upstanding from lever portion 30 is a stud 31 on which a bearing 32 is press fitted to be received in a slot 33 of a slide block 34 movable longitudinally in a slot 35 in the guide plate 20. The slide block 34 is provided with a threaded through bore 36 through which is threaded a rod 37 having its opposite ends 38 journalled in suitable upstanding journal blocks 39 on the guide plate 20 at the opposite ends of the slot 35 as shown in FIGURES 1 and 2. The slide block is further provided with a pair of upper transverse bores 40 and a pair of corresponding lower transverse bores 41 extending parallel to the slot 33. Pins 42 are fixed in the upper bores 40 and pins 43 are fixed in the lower bores 41 and carry, on their outwardly projecting ends, pairs of rollers 44 and 45 respectively. As shown in FIGURES 2 and 3, the upper rollers 44 roll against the upper surface 46 of the guide plate 20 at the opposite edges of the slot 35 and the lower rollers 45 roll against the lower surface 47 of the guide plate at the opposite edges of the slot 35. The rollers may be retained on the pins by suitable means such as heads 48 on the pins and cotter pins 49.

In the illustrated embodiment, the valve operator 10 is manually operated by means of a suitable conventional handle 50 which may be suitaby secured to the end 51 of the threaded rod 37 for rotating the rod 37 about the axis thereof and correspondingly causing the block 34 to move in the desired direction axially in slot 35. The limits of movement of the block 34 may be controlled by suitable adjustable stops 52 and 53 threadedly mounted in the upright supports 39 on the end plate 20 at the opposite ends of the slot 35. The rod 37 may be provided with collars 54 and 55 at the opposite ends thereof for retaining the rod against axial displacement relative to the supports 39.

The operation of operator 11 is extremely simple. The user merely rotates the rod 37 by suitable manipulation of handle 50 to cause the threaded engagement between the rod 37 and the block 34 to cause the block to move longitudinally in slot 35 in the desired direction for swinging the valve member 13 about the axis 17 of the valve shaft 12 to the desired position. The longitudinal movement of the block 34 is transmitted to the lever 19 through the bearing 32 and stud 31 movably received in the slot 33 of the block. As the bearing may move longitudinally through the slot 33, the arcuate travel of the stud 31 and bearing 32 is accommodated by the movement thereof in the slot perpendicular to the direction of movement of block 34 in the slot 35.

As the lever 19 is disposed between the guide plate 20 and the yoke 18, the operator 11 is extremely compact and economical of construction. Further, by virtue of the short lever arm and direct connections between the respective moving parts of the operator 11, improved facility in the operation of the valve is provided. Still further, by virtue of the adjustable stops 52 and 53, the operator may be readily adjusted to limit the turning of the valve member 13 accurately to the desired fully closed and fully opened positions. As the stops are readily adjustable, valve seat wear and the like may be readily compensated for by suitable adjustment of the limits of the valve movement. The entire valve operator assembly may be readily installed and removed relative to the valve, further minimizing the cost of the installation and permitting the facilitated maintenance when desired.

While I have shown and described one embodiment of my invention, it is to be understood that it is capable of many modifications. Changes, therefore, in the construction and arrangement may be made without departing from the spirit and scope of the invention as defined in the appended claims.

I claim:

1. An operator for turning a valve shaft projecting outwardly through a hub, said operator comprising: a yoke having an annular bight portion for fixed mounting on said hub and leg portions extending outwardly therefrom; a lever having a first portion adapted to be connected to the projecting valve shaft and a second portion overlying said yoke bight portion;

a guide plate carried by said yoke legs and overlying said lever second portion; and means on said guide plate connected to said lever for movement relative to said guide plate to turn said lever about the axis of said projecting shaft, said last said means being arranged to provide a maximum torque to said shaft at a position of said shaft intermediate the extremes of movement thereof.

2. The valve operator of claim 1 wherein said first portion of the lever partially underlies said guide plate.

3. The valve operator of claim 1 wherein said last named means includes a stud on said second portion of the lever and a block movably carried on said guide plate having a rectilinear slot receiving a portion of said stud for transmitting movement of said block to said stud.

4. The valve operator of claim 1 wherein said last named means includes a stud on said second portion of the lever and a block movably carried on said guide plate having a rectilinear slot receiving a portion of said stud for transmitting movement of said block to said stud, said block having rollers carried thereby for rolling engagement with said guide plate to support said block on said guide plate.

5. The valve operator of claim 1 wherein said guide plate defines a slot, and said last named means includes a block extending into said slot.

6. The valve operator of claim 1 wherein said guide plate defines a slot, and said last named means includes a block extending into said slot, a stud carried by said lever and operably connected to said block, said block having rollers carried thereby for rolling engagement with said guide plate to support said block on said guide plate, at least one pair of said rollers engaging said guide plate on opposite surfaces thereof.

7. The valve operator of claim 1 wherein said guide plate defines a slot, and said last named means includes a block extending into said slot, a stud carried by said lever and operably connected to said block, said block having rollers carried thereby for rolling engagement with said guide plate to support said block on said guide plate, at least one pair of said rollers engaging said guide plate on opposite surfaces thereof and at opposite sides of said slot.

8. An operator for turning a valve shaft projecting outwardly through a hub, said operator comprising: a yoke having an annular bight portion for fixed mounting on said hub and leg portions extending outwardly therefrom; a lever having a first portion adapted to be connected to the projecting valve shaft and a second portion overlying said yoke bight portion; a guide plate carried by said yoke legs and overlying said lever second portion; and means on said guide plate connected to said lever for movement relative to said guide plate to turn said lever about the axis of said projecting shaft, said last named means including a stud on said second portion of the lever and a block movably carried on said guide plate having a slot receiving a portion of said stud for transmitting movement of said block to said stud, said block having rollers carried thereby for rolling engagement with said guide plate to support said block on said guide plate, said block further having a plurality of bores therethrough, said rollers being received in said bores to project outwardly from the opposite ends thereof.

9. An operator for turning a valve shaft projecting outwardly through a hub, said operator comprising: a yoke having an annular bight portion for fixed mounting on said hub and leg portions extending outwardly therefrom; a lever having a first portion adapted to be connected to the projecting valve shaft and a second portion overlying said yoke bight portion; a guide plate carried by said yoke legs and overlying said lever second portion; and means on said guide plate connected to said lever for movement relative to said guide plate to turn said lever about the axis of said projecting shaft, said legs upstanding and extending laterally outwardly from said bight portion of the yoke.

10. An operator for turning a valve shaft projecting outwardly through a hub, said operator comprising: a yoke having an annular bight portion for fixed mounting on said hub and leg portions extending outwardly therefrom; a lever having a first portion adapted to be connected to the projecting valve shaft and a second portion overlying said yoke bight portion; a guide plate carried by said yoke legs and overlying said lever second portion; and means on said guide plate connected to said lever for movement relative to said guide plate to turn said lever about the axis of said projecting shaft, said last named means including a stud on said second portion of the lever and a block movably carried on said guide plate having a slot receiving a portion of said stud for transmitting movement of said block to said stud, said stud having a bearing fixed thereto for engagement with said block in said slot.

References Cited

UNITED STATES PATENTS 3,385,120   5/1968   Nott _____ 74—89.15

FRED C. MATTEN, JR., Primary Examiner

W. S. RATLIFF, JR., Assistant Examiner